United States Patent [19]

Schultz et al.

[11] Patent Number: 4,883,106
[45] Date of Patent: Nov. 28, 1989

[54] ROTARY WHEEL-END ASSEMBLY FOR TIRE INFLATION SYSTEM

[75] Inventors: Gary R. Schultz; Dale L. Kwasniewski, both of Kalamazoo, Mich.

[73] Assignee: Eaton Corporation, Cleveland, Ohio

[21] Appl. No.: 299,926

[22] Filed: Jan. 19, 1989

[51] Int. Cl.⁴ .................................... B60C 29/00
[52] U.S. Cl. ................................ 152/417; 152/415
[58] Field of Search ............... 152/415, 416, 417, 427; 403/37, 35; 285/363; 384/462, 477; 301/105 R, 124 R

[56] References Cited

U.S. PATENT DOCUMENTS 2,242,207  5/1941  Bowers .......................... 152/417
4,431,043  2/1984  Goodell et al. ................. 301/105 R Primary Examiner—Michael W. Ball
Assistant Examiner—Gregory J. Wilber
Attorney, Agent, or Firm—P. S. Rulon

[57] ABSTRACT

A rotary wheel-end assembly (90) is provided that includes a disc-like member (26) that when secured to a vehicular wheel hub (16) is operative to rotate relative a stationary axle spindle as well as provide a first chamber (28) about the end of axle (2). Assembly (90) has a passageway (36) therethrough for conveying pressurized air to the tire from axle (2) and includes a cover (42) secured in spaced-apart relationship to a side of member (26) facing away from axle (2) to provide a second chamber (46). Chambers (28) and (46) are adapted to hold a lubricant for lubricating frictional interaction between rotary assembly (90) and stationary axle (2) as well as wheel bearings (12) and at least one opening (40) is provided through member (26) for providing fluid communication between chambers (28) and (46) in addition to the preferable inclusion of at least one resilient closable member (48) through cover (42) for conveying lubricant into chamber (46).

10 Claims, 2 Drawing Sheets

ROTARY WHEEL-END ASSEMBLY FOR TIRE INFLATION SYSTEM

This invention relates generally to an assembly for use with central tire inflation systems CTIS, also known as onboard inflation systems and tire traction systems, and more particularly to a rotary assembly adapted for mounting to a rotary wheel hub of a stationary (non-driven) axle and operable to transfer fluid, such as air, between the tire and the axle whilst providing a liquid lubricant, such as a suitable oil, to lessen rotational friction between the rotary assembly and the stationary (non-rotating) axle.

BACKGROUND OF THE INVENTION

In (CTIS) systems, the inflation pressure of one or more vehicle tires is characteristically controlled from a remote location (usually the vehicle cab) using an onboard source of pressurized fluid which is commonly compressed air from the vehicle air brake compressor and/or a compressed air reservoir.

In order to transfer the air between the axle and the tire, a variety of wheel-end valve assemblies have been developed such as disclosed in U.S. Pat. Nos.: 2,634,781; 2,989,999; 3,276,502; 4,434,833; 4,437,504; 4,640,331; 4,678,017; and 4,724,879, the disclosures of which are incorporated herein by reference.

Such prior art assemblies, although purportedly effective in transferring fluid (air) between an axle and a tire, are characteristically expensive and complex in design and have not heretofor addressed the problem of providing a rotary assembly for transferring air conveyed through a stationary axle to a rotary tire that is inexpensive and simple in design and that is adapted to provide a liquid lubricant, such as oil, for lessening friction between the rotary assembly and stationary axle.

SUMMARY OF THE INVENTION

Accordingly, it is an object of this invention to provide a rotary wheel-end assembly for transferring a fluid, such as air, between a rotary tire and a non-driven (non-rotating) axle.

It is another object of this invention to provide a rotary wheel-end assembly for transferring a fluid, such as air, between a stationary vehicular axle and a rotary tire that is inexpensive and relatively simple in design.

It is still another object of this invention to provide a rotary wheel-end assembly for transferring a fluid, such as air, between a non-rotating axle and a rotary tire that is operative to provide a liquid lubricant for lessening friction between the assembly and the axle.

DESCRIPTION OF SOME PREFERRED EMBODIMENTS

Figure 1:
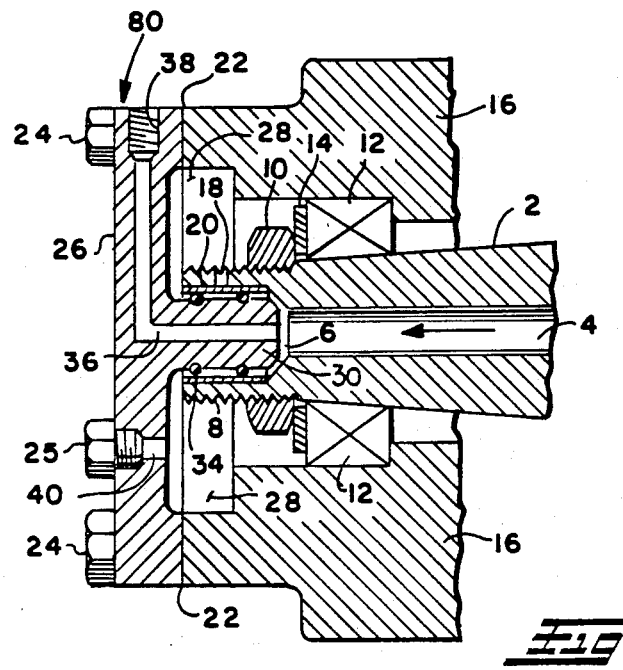
FIG. 1 is a central cross-sectional view of a rotary assembly 80 of the invention.

Rotary assembly 80 of FIG. 1 is secured by means such as bolts 24 to an annular surface 22 of an axle hub 16 facing theretowards. Hub 16 is rotatably mounted by means of suitable bearings 12 (only one shown) on a not-rotating axle spindle 2. Axle 2 has external threads 8 at its end that are threadingly engaged by a nut 10 that, upon rotational advancement along threads 8, presses against washer 14 to hold bearing 12 in place and enable hub 16 to rotate about axle 2. Axle 2 commonly includes a transverse opening 18 through threads 8 for receiving a cotter pin or the like to hold nut 19 in place. Although not shown, a tire rim and tire are secured to hub 16 and rotate in unison therewith about axle 2.

Axle 2 is a non-driven (non-rotating) axle of a vehicle having a central tire inflation system (CTIS) that includes a source of pressurized fluid (commonly air) as previously described. Axle 2 has a channel 4 therethrough communicating with an open-ended bore 6 at the end thereof facing towards assembly 80 for conveying the fluid therethrough from the pressurization source as shown by the arrow. Since axle 2 is non-rotating, it is not an absolute requirement that axle 2 have a channel 4 therethrough since the fluid could be conveyed to bore 6 by means of an exterior conduit that is in fluid communication with bore 6.

Assembly 80 includes a disc-like member 26 defining a first chamber 28 between hub 16 and a surface of member 26 facing theretowards within annular surface 22 when assembly 80 is secured to annular surface 22.

Assembly 80 includes a projection 30 having a substantially cylindrical portion thereof extending into bore 6 therefrom. Projection 30 is adapted to enable assembly 80 to rotate relative bore 6 and axle 2.

The radially outer surface of projection 30 within the radially inner surface of the axle bore 6 is provided with means for sealing against fluid leakage between whilst enabling assembly 80 to rotate relative bore 6 and axle 2.

Preferably the sealing means is provided by at least one resilient member such as a resilient "0" ring 34 disposed in an annular groove (not referenced) in the outer surface of projection 30.

Bore 6 preferably includes a tubular liner or sleeve 20 as a wear surface therewithin for member(s) 34 to bear against and to prevent any damage that might arise due to the entrance of opening 18 into bore 6. Sleeve 20 also provides a means to seal transverse opening 18, previously described, from bore 6.

Assembly 80 includes a passageway 36 extending through projection 30 and disc-like member 26 to an outlet port 38 that is adapted by means of suitable threads or the like to enable a connection (not shown) to be made thereto for conveying the inflation fluid (air) to the tire.

Disc-like member 26 of assembly 80 includes at least one opening 40 therethrough that for assembly 80 is closable by means of a threaded bolt 25 or other means that will ensure that opening 40 remains closed while hub 16 and assembly 80 is rotating about axle 2.

Opening 40 is adapted to enable a lubricant, such as a suitable lubricating oil, to be conveyed therethrough into chamber 28, (which is adapted to hold the lubricant) for lubricating bearing 12 and members 34 and projection 30.

Assembly 80 is thus operable to be mounted upon an annular surface 22 of hub 16 concentrically surrounding the end of axle 2 and facing theretowards. Assembly 80 is operable to rotate relative stationary axle 2 and to convey and transmit pressurized fluid such as air between axle 2 and the tire as well as include means such as chamber 28 for holding lubricant for lubricating projection 30 to lessen rotational friction between rotary assembly 80 and stationary axle 2.

Figure 2:
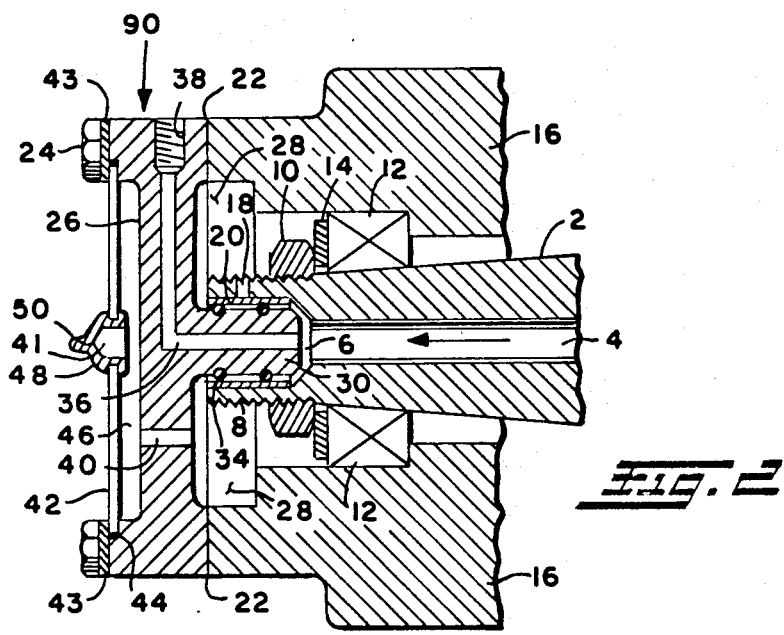
FIG. 2 is a central cross-sectional view of another embodiment of rotary assembly 90 of the invention.

Rotary assembly 90 of FIG. 2 is substantially the same as previously described assembly 80 excepting that it includes a cover member or plate 42 secured in spaced-apart relationship to a side of disc-like member 26 facing away from hub 16 defining a second chamber 46 therebetween.

Cover member 42 is preferably secured to member 26 by means of spacing ring 43 and bolts 24 used to secure assembly 90 to surface 22.

Second chamber 46, like first chamber 28, is adapted to hold liquid lubricant. At least one opening 40 extends through disc-like member 26 to enable the lubricant to flow into chamber 28 from chamber 46. Means for preventing lubricant from leaking between cover member 42 and disc-like member 26 from chamber 43, from chamber 46 is preferably provided by a resilient member such as "0" ring 44 that is held in a compressed condition between a surface of disc-like member 26, spacing ring 43 and and cover member 42 secured thereto.

Cover member 42 includes at least one closable opening 41 therethrough adapted to enable lubricant to be conveyed into chamber 46 without having to release cover member or plate 42 from member 26. Preferably the closable opening is provided by a closure member 48 secured thereacross that has a resiliently closable aperture 50. Closure member 48 can be removed to enable the lubricant to be conveyed into chamber 46 and replaced to contain the lubricant within chamber 46 and is additionally operable to act as a vent thru aperture 50 to vent any excessive pressure that may arise within chamber 46.

Cover member or plate 42 is preferably made from a suitable transparent material so as to enable determination of the amount of lubricant in chamber 46 without having to remove cover member 42 from disc-like member 26.

Figure 3:
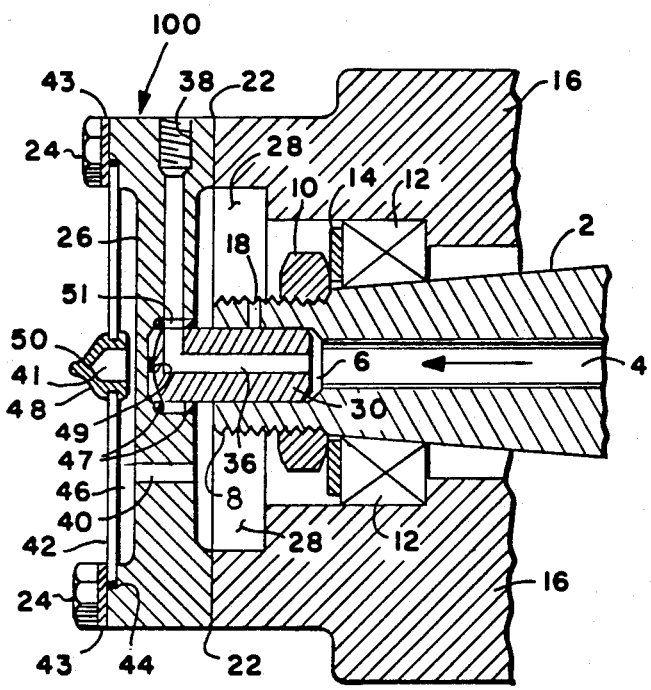
FIG. 3 is a central cross-sectional view of another embodiment of a rotary assembly 100 of the invention.

Assembly 100 of FIG. 3 is substantially the same as previously described assembly 90 excepting that projection 30 (although extending from disc-like member 26 into bore 6) is not integral therewith.

Projection 30 of assembly 100 is preferably press-fit into and extends for a prescribed distance from bore 6 and may include rotary spacer or seals 47 thereabout in addition to a spacer 49 at an end thereof facing towards disc-like member 26 operable to maintain a cavity 51 thereabout enabling disc-like member 26 to rotate relative to projection 30 (which is stationary relative bore 6) whilst enabling the fluid to be transmitted across cavity 51 through passageway 36.

The assembly of the invention provides a means for transferring fluid between a rotary tire and a stationary axle of a vehicle having a central tire inflation system while providing lubricant for lessening rotary friction between the assembly axle and wheel bearing element.

The assembly of the invention may be made from any material predetermined suitable such as steel or an aluminum alloy and preferably includes a transparent cover member for determining the amount of lubricant being held within the assembly.

Although some preferred embodiments of the present invention have been described with a certain degree of particularity, it is understood that various modifications may be resorted to without departing from the spirit of the invention as hereinafter claimed.

What is claimed is:

1. A rotary wheel-end assembly for a central tire fluid inflation system, said assembly securable to an annular surface of a wheel hub journaled for rotation on a non-rotating axle having an open-ended bore in the end thereof in fluid communication with the central inflation system, said assembly comprising;

a disc-like member securable to the wheel hub annular surface and, upon securement thereto, defining a first chamber between the wheel hub and a surface of said disc-like member within the annular surface facing theretowards, a projection extending from the disc-like member into the axle bore and adapted to enable rotary movement of the assembly relative thereto upon rotation of the wheel hub, means for sealing against fluid leakage between a radially inner axle surface surrounding said bore and a radially outer surface of the projection disposed therewithin whilst enabling rotary movement of the assembly relative thereto, a passageway extending through the projection axially and the disc-like member and operative to convey the fluid received from the axle bore therethrough to an outlet port thereof adapted to enable the fluid to be conveyed from the assembly to the tire, and said first chamber operative to hold a lubricant therein for lubricating the projection to lessen rotational friction between the rotary assembly and the axle.

2. The assembly of claim 1 wherein the disc-like member includes at least one opening therethrough adapted to enable the lubricant to be conveyed into the first chamber without having to release the assembly from the wheel hub annular surface.

3. The assembly of claim 1 including a cover member secured to a side of the disc-like member facing away from the wheel hub and defining a second chamber therebetween, said second chamber operable to hold the lubricant therein and to enable the lubricant to flow therefrom into the first chamber through the opening through the disc-like member therebetween.

4. The assembly of claim 3 wherein the cover member includes at least one closable opening therethrough operative to enable the lubricant to be conveyed into the the second chamber without having to remove the cover member from the disc-like member.

5. A rotary wheel-end assembly for a central tire fluid inflation system, said assembly securable to an annular surface of a wheel hub journaled for rotation on a non-rotating axle having an open-ended bore in the end thereof in fluid communication with the central inflation system, said assembly comprising;

a disc-like member securable to the wheel hub annular surface and, upon securement thereto, defining a first chamber between the wheel hub and a surface of said disc-like member within the annular surface facing theretowards, a projection extending stationarily from the axle bore and adapted to enable rotary movement of the disc-like member relative thereto upon rotation of the wheel hub, means for sealing against fluid leakage between the projection and the disc-like member, a passageway extending through the projection axially and the disc-like member and operative to convey fluid received from the axle bore therethrough to an outlet port thereof adapted to enable the fluid to be conveyed from the assembly to the tire, a cover member secured to a side of the disc-like member facing away from the wheel hub and defining a second chamber therebetween operable to contain a lubricant therein, at least one opening through the disc-like member operative to enable the lubricant to flow from the second chamber into the first chamber therethrough for lubricating the projection to lessen rotational friction between the rotary assembly and the axle, and at least one closable opening through the cover member for enabling the lubricant be conveyed therethrough into the first chamber without having to release the cover member from the disc-like member.

6. The assembly of claim 1 wherein the means for sealing against the fluid leakage comprises at least one annular groove in the outer surface of the projection cylindrical portion within the axle bore and a resilient sealing member disposed in the groove.

7. The assembly of claim 3 or 5 including means for sealing agaist lubricant leakage between the cover member and the disc-like member.

8. The assembly of claim 4 or 5 wherein the opening through the cover member is rendered closable by having a closure member secured to the cover plate thereacross having a resiliently closable aperture therethrough.

9. The assembly of claim 3 or 5 wherein the cover member is a transparent cover member operative to enable determination of lubricant level in the second chamber without having to release the cover member from the disc-like member.

10. The assembly of claim 7 wherein the lubricant sealing means comprises a resilient sealing member disposed intermediate the disc-like member and a surface of the cover member facing theretowards and that is under compression when the cover member is secured to the disc-like member.

* * * * *